US012759340B2

(12) United States Patent
Henig

(10) Patent No.: US 12,759,340 B2
(45) Date of Patent: Oct. 13, 2026

(54) BICYCLE RIM AND METHOD OF MANUFACTURING

(71) Applicant: DT SWISS INC., Grand Junction, CO (US)

(72) Inventor: Andreas Henig, Biel (CH)

(73) Assignee: DT SWISS INC., Grand Junction, CO (US)

(*) Notice: Subject to any disclaimer, the term of this patent is extended or adjusted under 35 U.S.C. 154(b) by 329 days.

(21) Appl. No.: 18/515,700

(22) Filed: Nov. 21, 2023

(65) Prior Publication Data

US 2024/0181803 A1 Jun. 6, 2024

(30) Foreign Application Priority Data

Dec. 2, 2022 (DE) ..................... 10 2022 132 034.0

(51) Int. Cl.
*B60B 5/02* (2006.01)
*B32B 5/02* (2006.01)
(Continued)

(52) U.S. Cl.
CPC ................ *B60B 5/02* (2013.01); *B32B 5/022* (2013.01); *B32B 5/12* (2013.01); *B32B 7/02* (2013.01); *B60B 21/026* (2013.01); *B29C 70/443* (2013.01); *B29K 2105/089* (2013.01); *B29L 2031/3091* (2013.01); *B29L 2031/32* (2013.01); *B32B 2260/023* (2013.01);
(Continued)

(58) Field of Classification Search
CPC ......... B60B 5/02; B60B 21/026; B32B 5/022; B32B 5/12; B32B 7/02; B29C 70/443
See application file for complete search history.

(56) References Cited

U.S. PATENT DOCUMENTS 4,252,378 A * 2/1981 DeBolt ..................... B60B 5/02
428/313.9
5,960,834 A 10/1999 Sekido et al.
(Continued)

FOREIGN PATENT DOCUMENTS

DE 4425592 A1 * 1/1996 ............. B29C 53/62
DE 102005028627 B3 12/2006
(Continued)

OTHER PUBLICATIONS

German Search Report received for Application No. 102022132034.0 dated Apr. 4, 2023.
(Continued)

*Primary Examiner* — Kip T Kotter
(74) *Attorney, Agent, or Firm* — Greer, Burns & Crain, Ltd

(57) ABSTRACT

A bicycle rim for bicycles with a rim body with a visible surface perceptible in proper operation, wherein a supporting structure of the rim body is made from fibrous composite materials of prepreg layers is disclosed. The rim body includes rim flanks disposed opposite one another, a rim well, and a rim base. The visible surface is formed by a thin non-woven layer on the supporting structure, so as to form directly during manufacturing, an optically appealing, visible surface on the rim body, involving no postprocessing. The non-woven layer forms on the rim body, an outer layer of a composite layer. The composite layer includes a prepreg layer and the non-woven layer.

7 Claims, 4 Drawing Sheets

(51) Int. Cl.

| | |
|---|---|
| ***B32B 5/12*** | (2006.01) |
| ***B32B 7/02*** | (2019.01) |
| ***B60B 21/02*** | (2006.01) |
| *B29C 70/44* | (2006.01) |
| *B29K 105/08* | (2006.01) |
| *B29L 31/30* | (2006.01) |
| *B29L 31/32* | (2006.01) |

(52) U.S. Cl.

CPC ... *B32B 2260/046* (2013.01); *B32B 2307/718* (2013.01); *B32B 2307/7376* (2023.05); *B32B 2605/00* (2013.01); *B60B 21/025* (2013.01); *B60B 2310/242* (2013.01); *B60B 2360/341* (2013.01); *B60B 2360/362* (2013.01); *B60B 2900/111* (2013.01)

(56) References Cited

U.S. PATENT DOCUMENTS

| | | | | |
|---|---|---|---|---|
| 6,458,306 | B1 | 10/2002 | Nelson et al. | |
| 2007/0057567 | A1* | 3/2007 | Jager | B60B 21/04 29/894.35 |
| 2008/0265658 | A1* | 10/2008 | Reuteler | B60B 5/02 29/894.35 |
| 2008/0296961 | A1* | 12/2008 | Dal Pra' | B60B 25/00 301/95.103 |
| 2010/0013119 | A1* | 1/2010 | Meggiolan | B29C 70/446 264/271.1 |
| 2011/0273001 | A1* | 11/2011 | Poertner | B60B 21/062 29/894.351 |
| 2012/0242138 | A1* | 9/2012 | Tsai | B60B 21/00 156/245 |
| 2018/0170097 | A1* | 6/2018 | Lo | B60B 21/08 |
| 2019/0168538 | A1* | 6/2019 | Feltrin | B60B 1/003 |
| 2019/0344514 | A1 | 11/2019 | Wakeham et al. | |

FOREIGN PATENT DOCUMENTS

| | | | |
|---|---|---|---|
| DE | 102009039185 | A1 | 3/2011 |
| DE | 102016106530 | A1 | 10/2017 |
| EP | 3495158 | A1 | 6/2019 |
| WO | 2013091083 | A1 | 6/2013 |

OTHER PUBLICATIONS

European Search Report received for Application No. 23210666.6 dated May 10, 2024.

* cited by examiner

BICYCLE RIM AND METHOD OF MANUFACTURING

BACKGROUND

The invention relates to a bicycle rim and a method of manufacturing a bicycle rim from a fibrous composite material for vehicles and, in particular, bicycles, which as a rule are at least partially muscle-powered in use as intended.

A great variety of bicycle rims from fiber-reinforced plastics have become known in the prior art. Employing fiber-reinforced plastics respectively fibrous composite materials reduces the weight of the pertaining bicycle rims. At the same time, these bicycle rims combine a reduced total weight with a comparable or even increased stability compared to bicycle rims of metallic materials. However, a drawback of these bicycle rims from fibrous composite materials is the complex manufacture, since many manufacturing steps require mostly manual work. This results in higher costs. Moreover, the many manual process steps are susceptible to errors, which may increase the reject rate, thus further increasing the manufacturing costs. On the other hand, high-quality bicycle rims are not manufactured in large enough quantities so that developing and setting up fully automated production would pay off.

It is a considerable problem in manufacturing bicycle rims from fibrous composite materials to obtain high quality surfaces. Although for many years there have been approaches and attempts to directly demold bicycle rims from fibrous composite materials involving no extensive refinishing, the methods required therefor have thus far not been successful enough or they are very complicated and thus expensive.

Where bicycle rims are to be manufactured from fibrous composite materials, the customers as a rule set high standards for the quality and also the optical appearance of these components. This results in the fact that bicycle rims from fibrous composite materials must as a rule be refinished to ensure the required surface quality. Small air pockets on the surface and other optical defects are as a rule not tolerated, even if they do not have negative effects on the stability of the bicycle rim. In many cases, bicycle rims from fibrous composite materials are therefore provided with a varnish coating immediately out of the manufacturing mold to mask respectively conceal any smaller and larger optical defects. This is complex and thus expensive and additionally increases the weight of the bicycle rim thus manufactured.

It is therefore the object of the present invention to provide a bicycle rim and a method of manufacturing a bicycle rim from fibrous composite materials, with which to manufacture bicycle rims having higher quality and lower reject rates. In particular, the surface quality of the visible surface must as a rule satisfy high standards even without extensive refinishing.

SUMMARY

A bicycle rim according to the invention is, in particular, provided for at least partially muscle-powered vehicles and preferably bicycles. The bicycle rim comprises at least one rim body, comprising a visible surface (immediately) perceptible respectively visible when properly assembled and operated. The rim body comprises opposite rim flanks, a rim well, and a rim base. A supporting structure of the rim body is partially of at least substantially or preferably entirely manufactured from a, respectively at least one, fibrous composite material of prepreg layers. The visible surface of the rim body is formed by a (thin) non-woven layer on the supporting structure, so as to form during manufacturing, directly out of the mold, an optically appealing, visible surface on the rim body. The non-woven layer forms an outer layer on the rim body. The non-woven layer is a part or component of a composite layer, which comprises at least one prepreg layer and the non-woven layer.

The bicycle rim according to the invention has many advantages. A considerable advantage of the bicycle rim according to the invention consists in the fact that a (thin) non-woven layer is disposed respectively configured on the visible outer surface on the supporting structure, to directly provide a high quality, visible surface. It is another advantage that the composite layer having at least one prepreg layer and the non-woven layer, can improve the homogeneity and stability of the rim structure. Surprisingly, it has been found that a thin, non-woven layer on the visible outside surface of the bicycle rim can directly obtain a higher surface quality than absent such a non-woven layer on the visible outer surface. Such a non-woven layer prevents, or at least considerably reduces, the quantity of flaws on the visible surface. This will largely prevent refinishing work on the visible surface and, in particular, revarnishing the visible surface to conceal air pockets and other flaws.

The non-woven layer is part of a composite layer comprising at least one prepreg layer and the non-woven layer. The composite layer is prepared first, and thus the composite layer can be perfectly prepared and draped. Thus, even minimal wrinkling in the prepreg layer and the non-woven layer may be prevented. Examinations of the rim structure of finished rims can verify this. Manufacturing is simpler, faster, and more cost-effective, and the bicycle rim offers a high and perfect surface quality combined with highest strength and stability. If the prepreg layer and the non-woven layer were applied sequentially, this would result in microscopically detectable, different structures, since draping and placing the non-woven layer can never be effected wrinkle-free—and thus detectable. Sections or X-rays or CT examinations or other measuring methods allow to measure structural differences due to local displacements of the prepreg layer relative to the non-woven layer. Applying a composite layer of at least one prepreg layer and one non-woven layer provides for better homogeneity and thus also better stability, since otherwise, undesired local buckling or elongations of the prepreg layer may occur.

Unlike many other bicycle parts, bicycle rims require a consistent quality over the entire periphery, since each and every peripheral spot is periodically stressed and relieved while the wheel is moving over the ground.

It is possible for the supporting structure to be at least partially formed by a composite layer with (at least) one prepreg layer and an outer non-woven layer, to form an optically appealing, visible surface on the rim body, and by means of a more robust supporting structure.

Manufacturing the bicycle rim according to the invention is simple and relatively inexpensive. This increases the profitability while concurrently increasing the quality.

Prepreg layers comprising reinforcing fibers and resin material are used for the bicycle rim. Particularly preferably, the resin material in the prepreg is provided in such a quantity that as a rule, no additional resin material needs to be added during manufacturing. At least 95% of the required resin material is provided in the prepregs.

The visible surface is at least considerably and, in particular, substantially or entirely formed by the non-woven layer. On the rim body, in particular, the non-woven layer is an outer layer of a composite layer, which comprises at least one prepreg layer and the non-woven layer. Employing composite layers is advantageous since manufacturing is thus simplified and preferably, the quality is increased. While two or more (still thinner) non-woven layers can also be employed, this considerably increases the complexity. Since the non-woven layer(s) do(es) not form the supporting structure, it is actually more advantageous to employ one single non-woven layer only. In particular cases, there may be reasons to apply two (or more particularly thin) non-woven layers.

All the methods thus far known for manufacturing fibrous composite component parts struggle with optical flaws to obtain series-produced products with finished surfaces, saleable "out of the mold". The invention solves this problem to a considerable extent.

After removing from the mold, the cured bicycle rim is not reworked for optical reasons. To this end, (at least) one non-woven layer is applied as the outermost visible layer. The entire non-woven layer is very thin.

Particularly preferably, the composite layer comprises two or more prepreg layers and the non-woven layer. It is possible and preferred for two (or more) prepreg layers to show reinforcing fibers in different orientations. This increases the stability and stressability of the bicycle rim.

In preferred configurations, at least one prepreg layer comprises unidirectional reinforcing fibers (UD layers). However, it is possible and particularly preferred for at least one prepreg layer (or all of the prepreg layers) to be configured as woven layers. Thus, both of the prepreg layers may be configured as woven layers. For example, the reinforcing fibers in the woven layers may be oriented at angles to one another to increase the stressability in various spatial directions.

In particularly preferred configurations, the supporting structure may comprise further prepreg layers for reinforcement layers. Thus, additional reinforcement layers may be provided in specific spots or overall.

Preferably, the non-woven layer provides less than 10% and particularly preferably less than 5% (or less than 2.5% or still less) of the stability of the rim body. In specific configurations, the non-woven layer may provide somewhat more of the stability of the rim body, but as a rule less than 25% or 33%. Basically, the share of the non-woven layer(s) in the stability is negligible.

Particularly preferably, the non-woven layer provides a high quality surface absent any air pockets and the like. In this respect, the non-woven layer may as a rule be omitted in terms of stability, respectively it is not required for ensuring the stability of the rim body. The stability of a bicycle rim is, in particular, understood to mean the resistance to tearing or breaking owing to mechanical influences and/or the flexural strength and/or the impact resistance and/or the shock absorption and/or the toughness of a bicycle rim. In terms of at least one of these properties, the non-woven layer provides less than 20% or less than 10% or less than 5% of the stressability of the rim body.

In preferred configurations, the thickness of the non-woven layer is less than 33% or less than 25% or less than 20% or less than 10% or less than 5% of the wall thickness of the supporting structure of the rim body. The relevant measure of the wall thickness of the supporting structure may, in particular, refer as a comparison dimension, to the maximum wall thickness of the supporting structure of the rim body. In preferred configurations, the relevant measure of the wall thickness of the supporting structure may refer to the average wall thickness or even the minimum wall thickness of the supporting structure.

In all the configurations it is preferred for the thickness of the non-woven layer to be less than 0.5 mm and, in particular, less than 0.3 mm. The thickness of the non-woven layer may also be less than 0.1 mm.

The weight per unit area of the fibrous material of the non-woven layer is preferably less than 25 grams per square meter (without resin, or in a non-impregnated condition). Preferably, the non-woven layer has a dry weight between 3 grams per square meter and 30 grams per square meter. Particularly preferably, the dry weight of the non-woven layer is between 3 and 15 grams per square meter and preferably between 4 and 12 grams per square meter. In particularly preferred configurations, the weight per unit area of the fibrous material of the non-woven layer is approximately 8 grams per square meter (+/−50%). This shows that the non-woven layer is very lightweight and provides for just a minor weight ratio of the weight of the bicycle rim. The percentage by weight of the non-woven layer relative to the total weight of the rim body is preferably less than 20% and, in particular, less 10% and it may be less than 5% or 3% or 1.5%. The low weight also shows that the non-woven layer serves to obtain a high optical quality but not a (specific respectively relevant) increase of the stability.

In preferred configurations, the prepreg layers comprise continuous fibers. In manufacturing, the prepreg layers are cut to a specific layer size, so as to have the reinforcing fibers end at the ends of the layer. The prepreg layers are particularly preferably manufactured without short fibers, but with reinforcing fibers configured long, which are, in particular, woven or braided together or the like.

Preferably, the non-woven layer is configured as a non-woven prepreg, comprising non-woven fibers in different lengths and resin for a matrix material. The non-woven fibers are, in particular, disposed randomly and overall, preferably evenly distributed.

Particularly preferably, the non-woven proportion of the non-woven layer (matrix content) is between 15% and 75%, and the non-woven proportion of the non-woven layer is, in particular, 40%+/−20%.

In all the configurations it is preferred for the prepreg layers to comprise carbon fibers and/or glass fibers as reinforcing fibers. It is likewise preferred for the non-woven layer to comprise carbon fibers, polyester fibers and/or glass fibers as non-woven fibers. Carbon fibers are particularly lightweight. They allow to provide a lightweight and stable bicycle rim.

In particularly preferred configurations, the bicycle rim is configured as a hollow rim. The bicycle rim preferably comprises a rim body with opposite rim flanks, a rim well, and a rim base. Spoke holes and a valve hole may be provided in the rim base. A (circumferential) hollow space is enclosed by the lateral rim flanks, the radially outwardly rim well, and the radially inwardly rim base.

In another configuration, the rim body of the bicycle rim forms at least part of a (hollow) handlebar. It is likewise possible for the rim body of the bicycle rim to provide at least one frame component or an entire frame for a bicycle.

Also, further components of a bicycle may be provided according to the invention. Also, a bicycle may be provided which comprises a number of bicycle components according to the application.

The method according to the invention serves to manufacture a bicycle rim, wherein the bicycle rim comprises at least one rim body, the supporting structure of which is manufactured from a fibrous composite material of prepreg layers. Such a bicycle rim is, in particular, provided for at least partially muscle-powered vehicles and preferably bicycles. In order to form a visible surface on the rim body, which is perceptible respectively visible in proper operation, a composite layer of a (thin) non-woven layer and at least one prepreg layer is inserted into the manufacturing mold. This is done so that the non-woven layer bears against the manufacturing mold. The visible surface is formed by the thin non-woven layer, and the supporting structure, by the prepreg layers. In manufacturing, an optically appealing visible surface is formed on the rim body (immediately out of the manufacturing mold).

The method according to the invention also has many advantages. It is a considerable advantage that bicycle rims showing high and higher surface quality can be manufactured in a simple way. Complicated, time-consuming refinishing work can largely be dispensed with.

The prepreg layers employed comprise reinforcing fibers and resin material. By means of the non-woven layer, an optically appealing visible surface is formed, the prepreg layers forming the stable and supporting structure of the rim body.

Preferably, the composite layer is first formed by way of joining at least one prepreg layer with the non-woven layer. In simple, preferred cases, the composite layer is formed by placing a prepreg layer on a backing, then placing the non-woven layer on top and pressing it onto the at least one prepreg layer. The lightweight non-woven layer alone cannot be readily placed and draped in a complex, three-dimensional mold, obtaining a high quality, high-grade surface. The draping properties (i.e. the spherical workability of a plane-like structure without wrinkle formation) of the non-woven layer per se are limited. This is why first, a composite layer of at least one prepreg layer and, in particular, two prepreg layers and one non-woven layer is formed. The composite layer on the whole can also be draped onto three-dimensional and complex structures, and can be matched to the shape of a manufacturing mold, wherein no or only insignificant wrinkles form. Although the non-woven layer could basically be placed in the mold by itself, it is not easy and difficult to handle.

Preferably, the composite layer is vacuum impregnated prior to placement in the manufacturing mold. However, the composite layer is placed in the manufacturing mold prior to hardening.

Particularly preferably, the composite layer is formed by two prepreg layers and the non-woven layer. The prepreg layers are, in particular, positioned on top of one another such that the reinforcing fibers of the prepreg layers do not all run in identical directions.

Preferably, the composite layer is pressed to the manufacturing mold full-surface. This is to ensure that a high quality bicycle rim is manufactured. The full-surface pressing (in synchrony or sequentially in different places) considerably reduces the quantity of flaws. Any air pockets remaining are removed.

In all the configurations it is possible and preferred, after placing respectively inserting the composite layer in the manufacturing mold, to (additionally) place respectively insert reinforcement layers in the manufacturing mold. This allows local adaptation, and reinforcement as needed, of the supporting structure.

In all the configurations, it is possible and preferred for the manufacturing mold loaded with the prepreg layers and the non-woven layer and optionally reinforcement layers, to be evacuated. The manufacturing mold may be placed in a press device and heated.

After hardening, the bicycle rim is removed from the manufacturing mold, and separation points of the manufacturing mold allow to readily remove any oozed resin. As a rule, the visible surface does not require any refinishing.

For example, when a rim such as a bicycle rim is manufactured with the method according to the application, comprising rim flanks, a rim well and a rim base, then preferably a prepreg layer is applied directly onto the ring part (respectively its segments) of the manufacturing mold forming the rim well. It is not required to apply a non-woven layer there, since in proper use, the rim well is a non-visible part of a rim. A significant factor of a rim is that the rim flanks, the rim flanges if any, and the rim base show a high optical quality.

After removing a rim such as a bicycle rim, for example spoke holes and a valve hole can then be inserted.

The applicant retains the right to seek separate protection for a bicycle rim, provided for at least partially muscle-powered vehicles and, in particular, bicycles, and comprising a rim body showing a visible surface on at least one outer surface. The visible surface is substantially provided by a composite layer, the composite layer comprising at least one prepreg layer and an outer non-woven layer joined thereto. The outer non-woven layer forms the visible surface.

On the whole, the method according to the invention serves to manufacture high quality bicycle rims, which as a rule do not show any optical defects on the visible surfaces. This allows cost reduction due to saving time and to omitting subsequent processing steps for removing optical defects. Thus, processing steps such as grinding, repairing defects and coating may be omitted. Cost reduction is also achieved by reducing the reject rate because of a reduced number of optical defects.

In preferred configurations, two prepreg layers of unidirectional fibers (UD prepreg layers) are combined in different angular orientations (for example +/−45°) relative to one another to form a laying respectively a double layer. Preferably, a prepreg non-woven layer is placed onto the laying and pressed on and preferably vacuum impregnated, so as to obtain a composite layer of three layers. The composite layer can be cut to the required shape and dimensions. Then, the composite layer will face the mold or manufacturing mold with its non-woven side, and placed in the manufacturing mold where it is, in particular, pressed on. Thereafter, further reinforcement layers may be inserted. After closing the manufacturing mold, hardening follows, preferably in a hot press, under pressure and vacuum. The bicycle rim such as a rim may be removed from the manufacturing mold, and any excess resin may be removed. Further process steps such as boring spoke holes or removing a tubular film may follow.

The non-woven layer provides a clear improvement to the surface quality. There are only very few surface flaws, or none at all. This reduces working hours, costs, and the quantity of process steps. Thus, one can obtain a saleable surface directly out of the manufacturing mold ("out of the mold"). Postprocessing the bicycle rim is as a rule not required. Grinding or coating can be omitted.

Higher efficiency is achieved, since less respectively no sequential operations are required. The weight of the bicycle rim can be improved due to absent coating. Furthermore, the ecobalance is improved, and a simple, very high quality product is provided, different from simple mass production.

Further advantages and features of the present invention can be taken from the exemplary embodiments which will be discussed below with reference to the enclosed figures.

DETAILED DESCRIPTION

Figure 1:
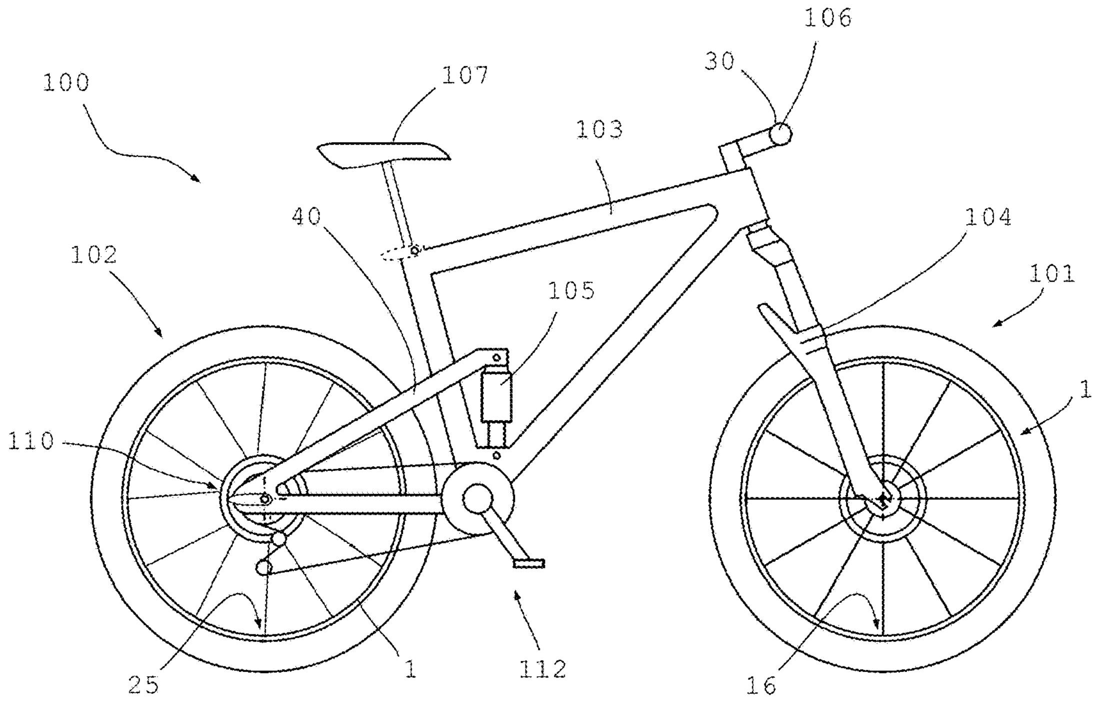
FIG. 1 a schematic illustration of a mountain bike with bicycle rims according to the invention.
Figure 2:
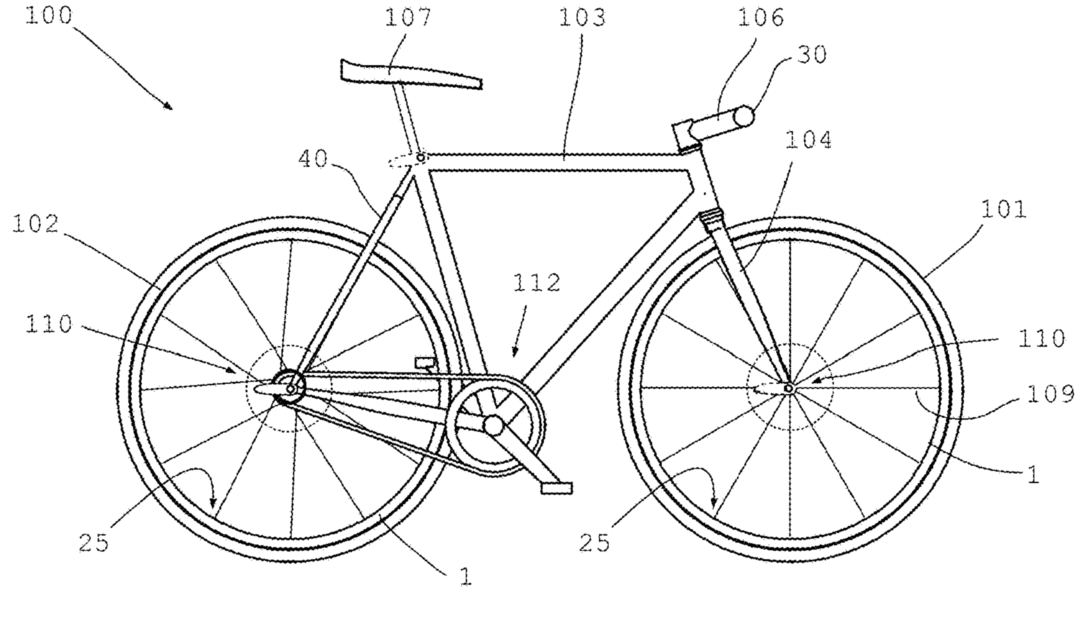
FIG. 2 a schematic illustration of a racing bicycle with bicycle rims according to the invention.

The FIGS. 1 and 2 illustrate a mountain bike respectively a racing bicycle 100, each equipped with bicycle rims 1 according to the application. The mountain bike respectively racing bicycle 100 comprise a front wheel 101 and a rear wheel 102 each, where bicycle rims 1 according to the application respectively rims are used. The two wheels 101, 102 are provided with spokes 109 to connect the rims 1 with the hubs 110. To this end, the rim 1 is provided with spoke holes 25. The mountain bike respectively racing bicycle 100 comprise a handlebar 30 and a frame 103 each.

A bicycle 100 has a frame 103 with frame components 40, a handle 106 with a handlebar 30, a saddle 107, a fork respectively suspension fork 104, and the mountain bike may be provided with a rear wheel damper 105. A pedal crank 112 with pedals serves for driving.

Optionally the pedal crank 112 and/or the wheels may be provided with an electrical auxiliary drive. The hub 110 of the wheels may be attached to the frame by means of a clamping system such as a through axle or a quick release.

Figure 3:
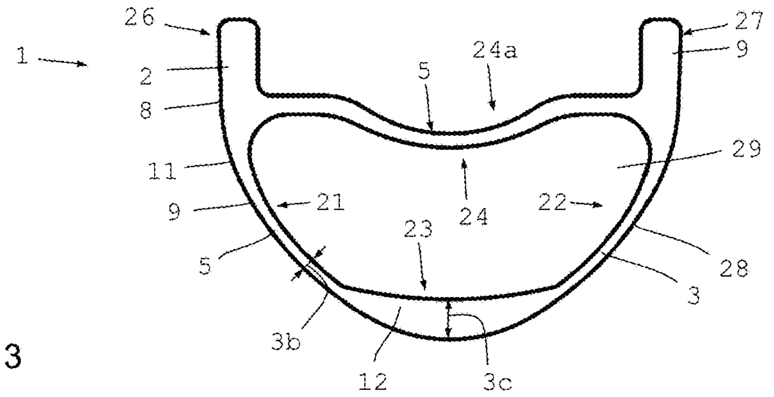
FIG. 3 a bicycle rim according to the invention.

FIG. 3 shows a bicycle rim respectively rim 1 as a bicycle component in a schematic cross section. The rim 1 is configured as a hollow rim and has a hollow space 29 in the interior of the rim 1 between the radially inwardly rim base 23 and the radially outwardly rim well 24. On the sides, rim flanks 21 and 22 are provided, extending convex between the rim base 23 and the radially outwardly rim flanges 26 and 27. The rim 1 has a component body respectively rim body 2, whose supporting structure 3 is provided by prepreg layers 5. The radially outwardly side 24*a* of the rim well 24 between the rim flanges 26 and 27 is as a rule not visible in proper use, since this is where the tire plus optionally a tube is/are received.

Therefore, the visible surface 8 extends on the inner surface 28 from the rim flange 26 across the rim base 23 up to the other, opposite rim flank 22. This visible surface 8 is again provided by a non-woven layer 9 (see FIGS. 4*a* and 4*b*), extending over the inner surface 28 and across the rim flanks 21, 22 and the rim base 23 up to and including the rim flanges 26, 27. The thin and lightweight non-woven layer 9 preferably has an end weight of less than 10 grams. In particular, the weight proportion of the non-woven layer (resin plus fibers) is relative to the total weight of the rim 1 less than 2% or even less than 1.5% and may be less than 1% or less than 0.5%.

Surprisingly, the non-woven layer 9 achieves considerable improvement of the optical quality of the rim 1 removed from the manufacturing mold 50 and to reduce the quantity of defects on the visible surface 8 to such an extent that postprocessing is not necessary as a rule, thus reducing the manufacturing costs and increasing the quality of the rim 1.

The supporting structure 3 is formed by a number of prepreg layers 5. The supporting structure 3 provides the majority of the stability of the rim body 2. The non-woven layer 9 only provides a very low proportion of 5%, 10% or maybe 15% of the stability of the rim body 2. The predominant part (80%, 90% or more) of the stability of the supporting structure 3 respectively the rim body 2 is provided by the prepreg layers 5 from fibrous composite materials 4. A minimum wall thickness 3*b* of the supporting structure 3 is formed in the convex region of the rim flanks 21 and 22, while in the region of the rim base 23, additionally inserted reinforcement layers 12 achieve a higher maximum wall thickness 3*c* of the supporting structure 3, other than crossing points such as the connecting points of the rim well 24 and the rim flanks 21, 22.

Basically, the outer layer 11 provides the visible surface 8 by way of a non-woven layer 9. The prepreg layers 5*a* and 5*b* follow toward the inside, forming the supporting structure 3 of the rim body 2. Further reinforcement layers 12 may be comprised inside.

Figure 4A:
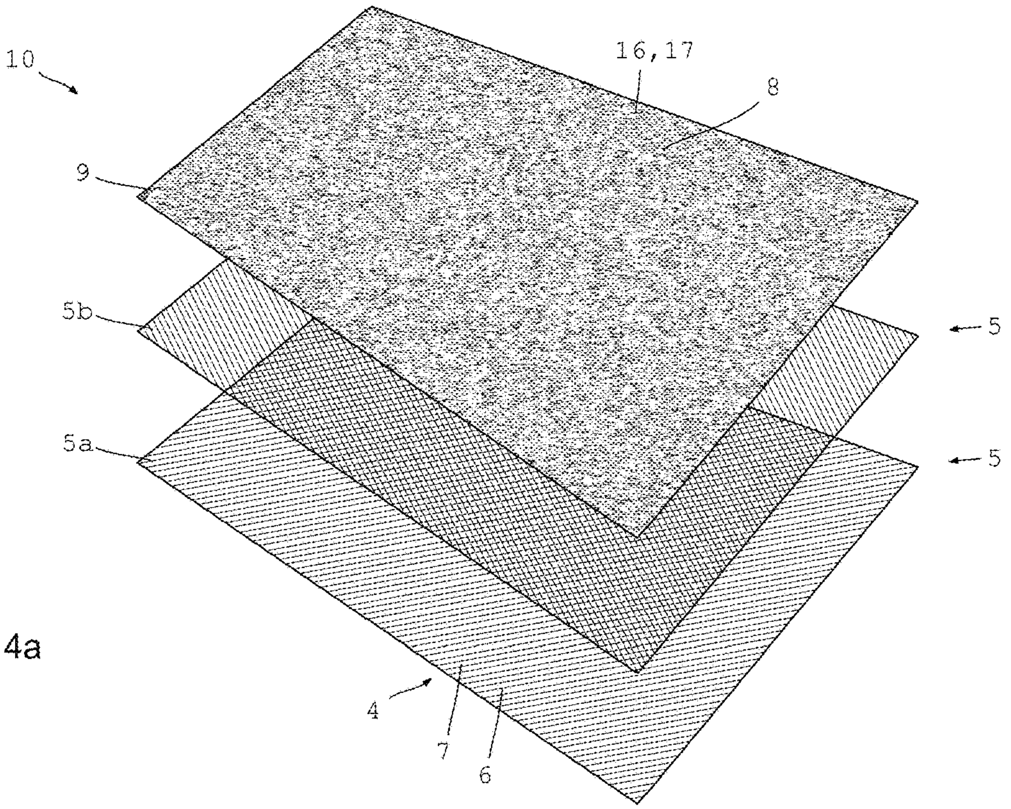
FIGS. 4*a*, 4*b* a non-woven layer and two prepreg layers in manufacturing the bicycle rim according to the invention.

FIG. 4*a* shows a schematic, perspective illustration of a non-woven layer and two prepreg layers 5*a* and 5*b*, which are joined together to form a composite layer 10, which is thereafter inserted into a manufacturing mold 50 to manufacture a bicycle rim 1.

Figure 4B:
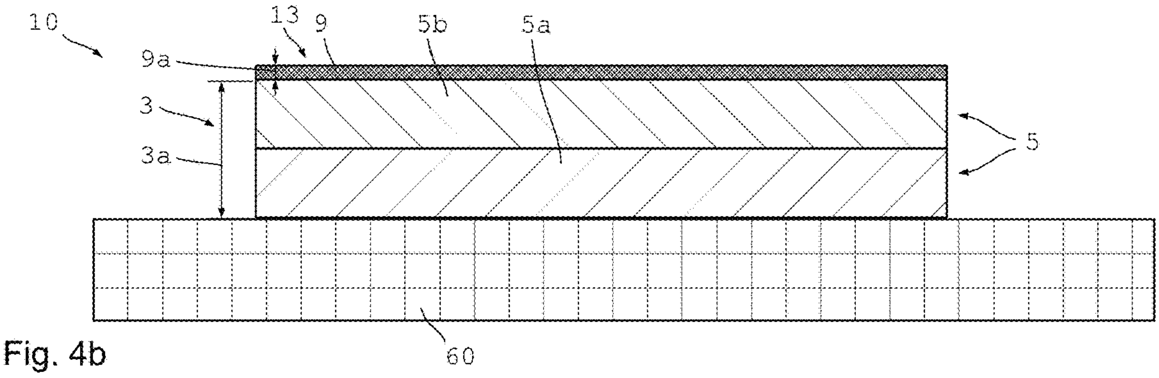

FIG. 4*b* shows a schematic and sectional side view of the composite layer 10 on a backing 60. Firstly, a (first) prepreg layer 5*a* is positioned on the backing 60. Thereafter, a second prepreg layer 5*b* is disposed on the first prepreg layer 5*a*. Finally, the non-woven layer 9, which is very lightweight and thin and therefore difficult to drape, is placed, as wrinkle-free as possible, to form a composite layer of three layers, the composite layer 10. The stacked prepreg layers 5*a*, 5*b* and the non-woven layer 9 are pressed to one another. It is possible to vacuum impregnate the composite layer 10 so as to form a very homogeneous and very closely joined composite layer.

For producing large quantities, the composite layer 10 may be manufactured by way of automatically feeding prepreg layers 5*a* (and 5*b*) and at least one non-woven layer 9, which are unwound from separate rolls, and assembled and pressed together. Then, the composite layer 10 may be cut to the sizes required.

Using prepregs for the fiber layers 5*a* and 5*b* and the non-woven layer 9, causes these layers to adhere to one another, thus enabling a simple way of joint draping in the manufacturing mold 50.

As can be seen in FIG. 4*a*, the reinforcing fibers 6 of the two prepreg layers 5*a* and 5*b* run transverse to one another and thus on the whole allow increased stability of a bicycle rim 1 thus manufactured. The matrix material used is a resin material 7, so that no additional resin is needed for the composite layer 10 nor otherwise. The non-woven layer 9 comprises a fibrous material 16 in the shape of non-woven fibers 17. The non-woven fibers may be formed by short-fiber and/or long-fiber reinforcing fibers. The non-woven fibers 17 are homogeneously distributed over the surface of the non-woven layer 9, and disposed randomly and actually disordered relative to one another, and not woven nor braided.

FIG. 4*b* schematically shows the two prepreg layers 5*a* and 5*b* and disposed on the second prepreg layer 5*b*, the non-woven layer 9, which forms the visible outer surface of the finished component. It can be clearly seen that the thickness 9*a* of the non-woven layer 9 is considerably less than the wall thickness 3*a* of the supporting structure 3, which is formed by the prepreg layers 5*a* and 5*b*. In the exemplary embodiment, the thickness 9*a* of the non-woven layer 9 is less than 1/10 of the wall thickness 3*a* of the supporting structure 3, which in this case is formed only of the two prepreg layers 5*a* and 5*b*. Thus, the non-woven layer 9 provides only very little of the total weight of the bicycle rim 1.

Figure 5A:
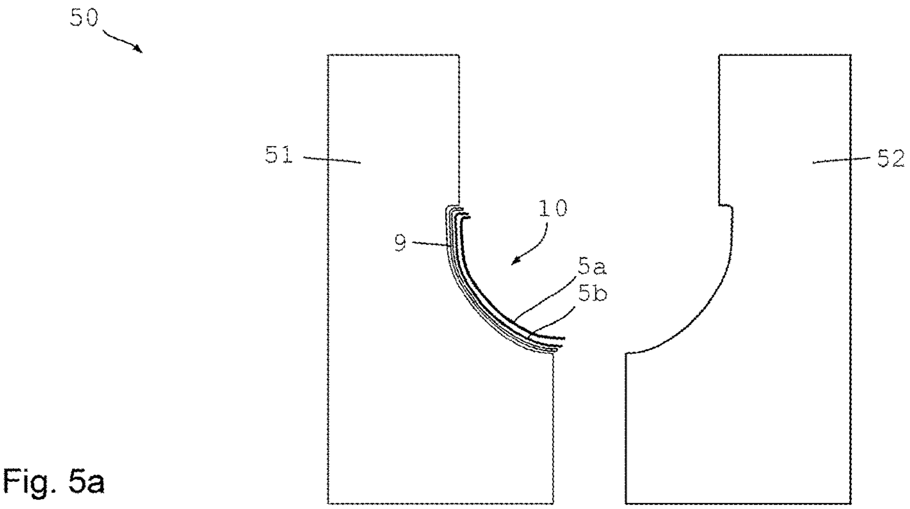
FIGS. 5*a*-5*c* various steps in manufacturing a rim according to the invention for a bicycle.
Figure 5B:
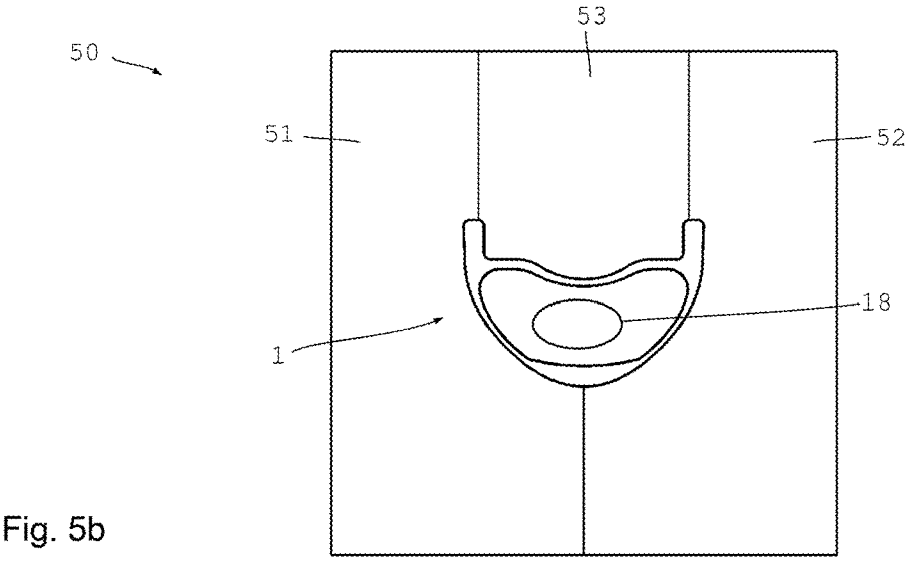
Figure 5C:
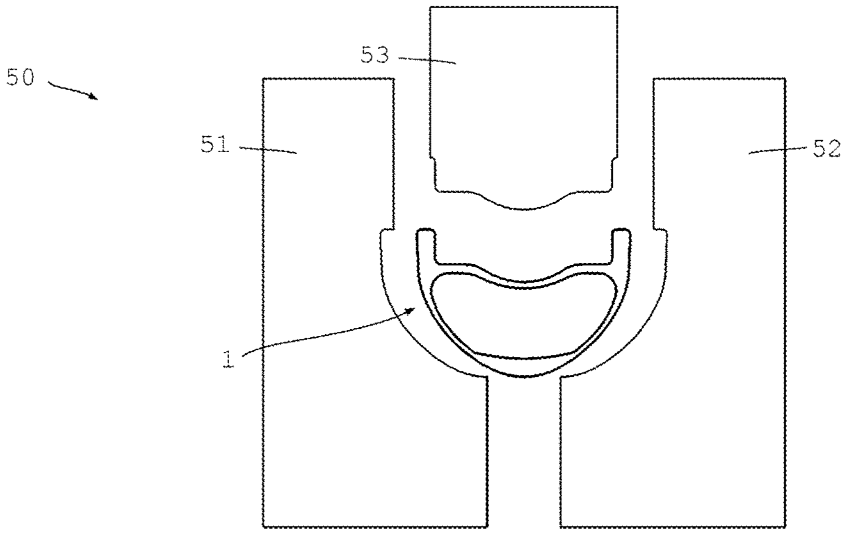

FIGS. 5*a* to 5*c* show three successive steps in manufacturing a rim, the bicycle rim 1. FIG. 5*a* schematically illustrates the two moldings 51 and 52 of the manufacturing mold 50. The composite layer 10 is inserted in the molding 51, such that the non-woven layer 9 covers the contact surface with the molding 51. Thus, the non-woven layer 9 provides what later is the outer, visible surface 8 of the finished rim 1, which is perceptible respectively visible in normal operation. After covering the first molding and the second molding and the ring part 53, the manufacturing mold 50 is closed, so as to obtain the condition shown in FIG. 5*b*. The interior of the rim 1 schematically shows an inflatable tube 18, which is pumped up to generate the required counterpressure from the inside.

The outside surfaces are provided on the rim flanks 21 and 22 and the rim base 23, with a (continuous or two-part right/left) non-woven layer 9, which is provided to form on what is to be the rim 1, the surface 8 of which can be directly seen from the outside.

After heating and curing the fibrous composite material, the manufacturing mold 50 can be opened. Then, the ring part 53 respectively its segments are removed radially outwardly, and the finished rim 1 can be taken out of the manufacturing mold 50.

Figure 6:
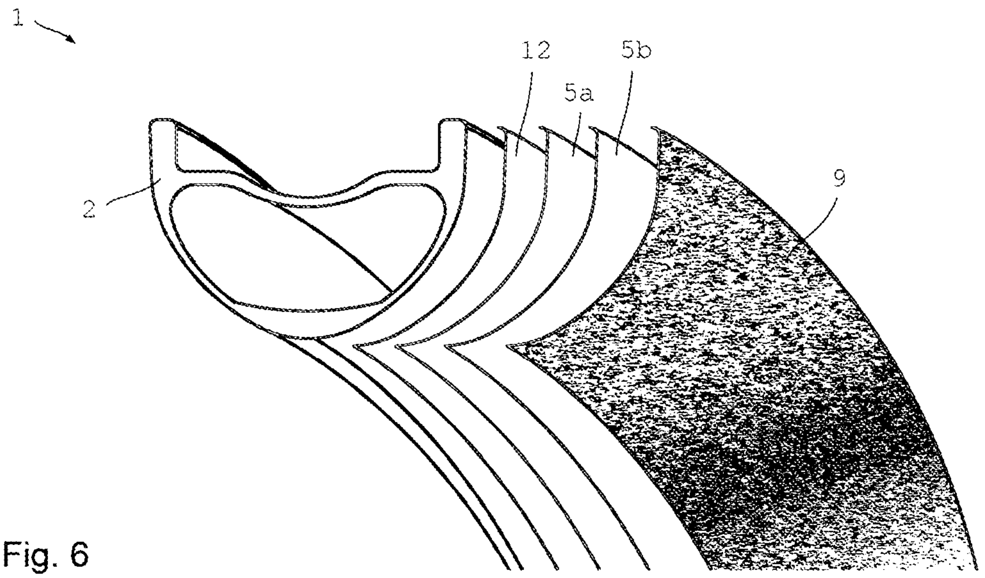
FIG. 6 a perspective view of a bicycle rim according to the invention.

Thereafter, the rim body 2 may be provided with spoke holes 25, and any excess resin may be removed. There is no need for extensive refinishing of the visible outer surface. FIG. 6 shows a schematic, perspective illustration of a rim 1. FIG. 6 shows the rim body 2 of the rim 1, schematically showing on the right the outer, non-woven layer 9 and the two prepreg layers 5*a* and 5*b* of the composite layer 10, and a reinforcement layer 12.

Overall, the invention provides high quality bicycle rims, the supporting structure of which is formed by prepreg layers 5. A high quality, visible outer surface 8 is provided by a thin, non-woven layer 9. The quantity of any optical defects is largely reduced, so as to provide the visible surface 8 largely without any postprocessing to the surface.

While a particular embodiment of the present bicycle rim and method of manufacturing have been described herein, it will be appreciated by those skilled in the art that changes and modifications may be made thereto without departing from the invention in its broader aspects and as set forth in the following claims.

LIST OF REFERENCE NUMERALS

1 bicycle rim, rim, bicycle component
2 rim body, component body
3 supporting structure
3*a* wall thickness
3*b* minimum wall thickness
3*c* maximum wall thickness
4 fibrous composite material
5 prepreg layer
5*a* first prepreg layer
5*b* second prepreg layer
6 reinforcing fibers
7 resin material
8 visible surface
9 non-woven layer
9*a* thickness of 9
10 composite layer
11 outer layer of 10
12 reinforcement layer
13 layer size
16 fibrous material of 9
17 non-woven fibers
18 inflatable tube
21 rim flank
22 rim flank
23 rim base
24 rim well
24*a* radially outside surface
25 spoke hole
26 rim flange
27 rim flange
28 inner surface, visible surface
29 hollow space
30 handlebar
40 frame component
50 manufacturing mold
51 molding
52 molding
53 ring part
60 backing
100 bicycle
101 wheel, front wheel
102 wheel, rear wheel
103 frame
104 fork, suspension fork
105 rear wheel damper
106 handlebar, handle
107 saddle
109 spoke
110 hub
112 pedal crank

The invention claimed is:

1. A method of manufacturing a bicycle rim having at least one rim body, a supporting structure of which is manufactured from a fibrous composite material of prepreg layers, wherein the rim body comprises rim flanks disposed opposite one another, a rim well, and a rim base, comprising:

forming a visible surface on the rim body which is visible in proper operation, a composite layer of a thin, non-woven layer and the supporting structure of the prepreg layers is inserted into a manufacturing mold so that the non-woven layer bears against the manufacturing mold, so that the visible surface is formed by the thin non-woven layer, and the supporting structure is formed by the prepreg layers, so as to form during manufacturing an optically appealing, visible surface on the rim body, and the non-woven layer on the rim body is an outer layer of the composite layer, which comprises at least one prepreg layer and the non-woven layer, wherein the composite layer is made by joining at least one of the prepreg layers with the non-woven layer and wherein the composite layer is then inserted into the manufacturing mold.

2. The method according to claim 1, wherein the composite layer is first formed by way of joining at least one of said prepreg layers with the non-woven layer, and wherein for forming the composite layer, at least one of said prepreg layers is placed on a backing and the non-woven layer is placed on top and then pressed onto the at least one prepreg layer.

3. The method according to claim 1, wherein the composite layer is vacuum impregnated prior to placement in the manufacturing mold.

4. The method according to claim 1, wherein the composite layer is pressed onto the manufacturing mold full-surface, and wherein after placing/inserting the composite layer in the manufacturing mold, reinforcement layers are placed/inserted in the manufacturing mold.

5. The method according to claim 1, wherein the manufacturing mold loaded with the prepreg layers and the non-woven layer and optionally with reinforcement layers, is evacuated, and wherein the manufacturing mold is placed in a press device and heated.

6. The method according to claim 1, wherein for manufacturing the rim, at least one said prepreg layer of said prepreg layers and no non-woven layer is applied directly on a ring part forming the rim well, and wherein after removing the rim, spoke holes are inserted.

7. A bicycle rim manufactured according to the method of claim 1.

* * * * *